United States Patent [19]

Morrill

[11] Patent Number: 4,849,667
[45] Date of Patent: Jul. 18, 1989

[54] MOTOR MOUNT

[76] Inventor: Giles W. Morrill, P.O. Box 531, Rocky Fork, Erwin, Tenn. 37650

[21] Appl. No.: 273,997

[22] Filed: Nov. 21, 1988

Related U.S. Application Data

[60] Division of Ser. No. 206,911, Jun. 10, 1988, which is a continuation of Ser. No. 55,160, May 28, 1987.

[51] Int. Cl.⁴ ............................................. H02K 5/00
[52] U.S. Cl. .................................... 310/91; 248/674; 248/675
[58] Field of Search ........................................... 310/91

[56] References Cited

U.S. PATENT DOCUMENTS

| | | | | |
|---|---|---|---|---|
| 3,043,970 | 10/1959 | Hatten | ................................... | 310/91 |
| 4,033,531 | 7/1977 | Levine | ................................... | 310/91 |
| 4,492,357 | 1/1985 | Morrill | ................................... | 248/674 |

Primary Examiner—Patrick R. Salce
Assistant Examiner—Tien M. Nguyen
Attorney, Agent, or Firm—Pearne, Gordon, McCoy & Granger

[57] ABSTRACT

An electric motor mount is achieved by first and second sheet metal pieces, the first piece being longer than that of the second and the first piece having a first and a second end, the second end being wider than that of the first end. The first and second pieces are stamped in sequence from a strip of sheet metal, and the first piece has a median transition portion forming a transition in width between the wider second end and the narrower first end. This median transition portion is complementary to a portion of the second piece, so that they are nested together, with no waste in the sheet metal strip. Each piece is bent at about right angles, and then the first ends are mounted to the motor at motor mounting apertures, and the second ends form mounting feet to be attached to a support for the motor and motor mount. The foregoing abstract is merely a resume of one general application, is not a complete discussion of all principles of operation or applications, and is not to be construed as a limitation on the scope of the claimed subject matter.

15 Claims, 2 Drawing Sheets

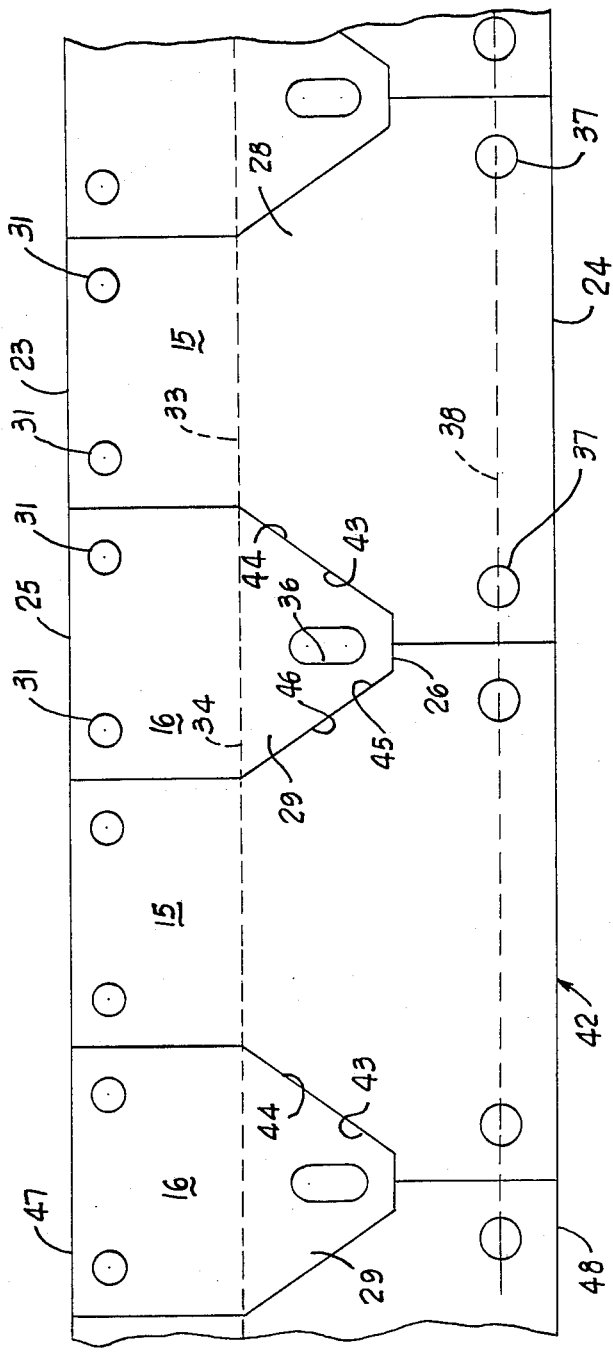

MOTOR MOUNT

This application is a division of application Ser. No. 07/206,911, filed June 10, 1988, which is a continuation of application Ser. No. 07/055,160, filed May 28, 1987.

BACKGROUND OF THE INVENTION

An electric motor mount has previously been used for a refrigeration cabinet. This electric motor mount was generally rectangular and about twice as long as it was wide. An electric motor for driving a fan was fixed on this mount. One end of the mount was held to the refrigeration cabinet by a single screw. The other end of the motor mount had two alternative conditions: it could be screwed to the refrigeration cabinet at two apertures; or that end of the amount could slip into a slot or shoe in the refrigeration cabinet, so that only the single screw was necessary to mount the motor mount to the refrigeration cabinet.

This prior electric mount was used in several different types of refrigeration cabinets, but it used a relatively large, generally rectangular piece of sheet metal, with a U-shaped bend in the intermediate portion thereof so that the motor itself would have clearance relative to the refrigeration cabinet. This large, rectangular sheet metal mount utilized an excessive amount of sheet metal, required blanking and multiple forming, and required an excessive amount of labor.

Prior U.S. patents have suggested the nesting of parts of laminations of electric motors in a long strip of sheet metal in order to conserve the use of sheet metal in the construction of an electric motor. As examples, U.S. Pat. Nos. 3,983,621 and 4,013,910 show such nesting. U.S. Pat. No. 1,414,900 has shown the use of two sheet metal stamped feet for a motor support. U.S. Pat. No. 2,626,454 has disclosed the concept of fashioning identical cleats in sequence and positioned oppositely in a strip of sheet metal.

SUMMARY OF THE INVENTION

The problem to be solved, therefore, is how to construct an electric mount of sheet metal which utilizes a minimum of sheet metal and minimizes the labor content in the fabrication of the mount and its fastening to the electric motor.

This problem is solved by an electric motor mount for a motor having a plurality of mounting points, said electric motor mount comprising, in combination, first and second sheet metal pieces, said first piece having a length between first and second ends and said second piece having a length between first and second ends, said second end of said first piece being wider than said first end, the combined width of said first ends of said first and second pieces approximately the width of the second end of said first piece, said first piece having a median transition portion forming a transition in width between said wider second end and said narrower first end, said median transition portion being substantially complementary to a portion of said second piece, at least one motor mounting aperture near said first end of each of said first and second pieces corresponding to at least one of said plurality of mounting points on the motor, and means near said second end of each of said first and second pieces to coact with a support for the motor with attached first and second pieces.

The problem is further solved by a combined electric motor and mount for a motor having a plurality of mounting points, said electric motor mount comprising, in combination, first and second sheet metal pieces, said first piece having a length between first and second ends and said second piece having a length between first and second ends, said second end of said first piece being wider than said first end thereof, the combined width of said first ends of said first and second pieces approximating the width of the second end of said first piece, said first piece having a median transition portion forming a transition in width between said wider second end and said narrower first end, said median transition portion being substantially complementary to a portion of said second piece, at least one motor mounting aperture near said first end of each of said first and second pieces corresponding to at least one of said plurality of mounting points on said motor, and means attaching said first end of each piece at said at least one motor mounting aperture thereof to said motor at said mounting points thereof.

Accordingly, an object of the invention is to provide an electric motor mount fashioned from two sheet metal pieces which are nested in a strip of sheet metal and stamped therefrom.

Another object of the invention is to provide an electric motor mount from two sheet metal pieces, the first piece having a median transition portion from wide to narrow, and the second piece having a portion generally complementary to the transition portion of the first piece.

Other objects and a fuller understanding of the invention may be had by referring to the following description and claims, taken in conjunction with the accompanying drawing.

BRIEF DESCRIPTION OF THE DRAWING

FIG. 8 is a plan view of a sheet metal strip from which the first and second pieces may be formed.

DESCRIPTION OF THE PREFERRED EMBODIMENT

Figure 1:
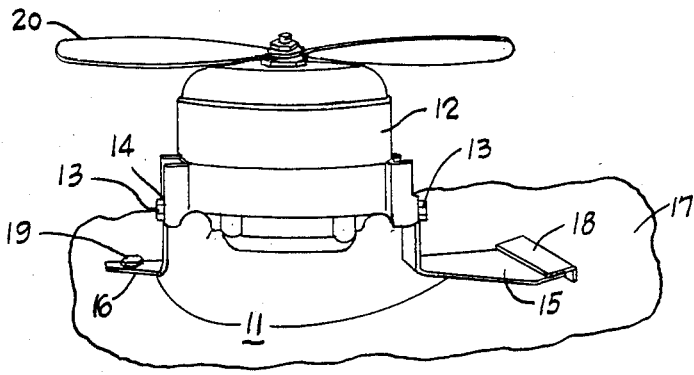
FIG. 1 is a perspective view of the motor mount of the invention, together with the motor being mounted and the support to which the mount is secured.
Figure 2:
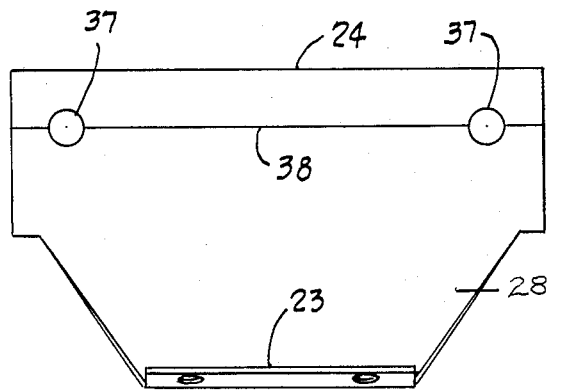
FIG. 2 is a plan view of a first sheet metal piece.
Figure 3:
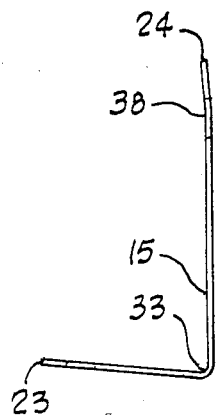
FIG. 3 is a front elevational view of the first piece of FIG. 2.
Figure 4:
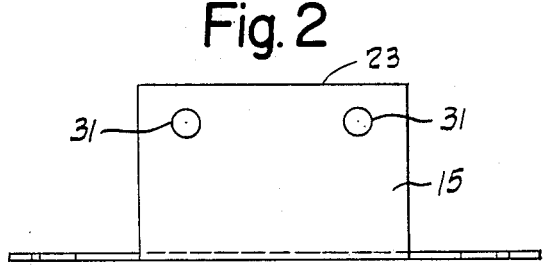
FIG. 4 is a side elevational view of the first piece of FIG. 2.
Figure 5:
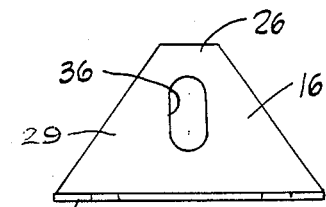
FIG. 5 is a plan view of a second sheet metal piece.
Figure 7:
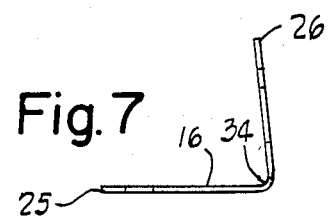
FIG. 7 is a side elevational view of the second piece.
Figure 6:
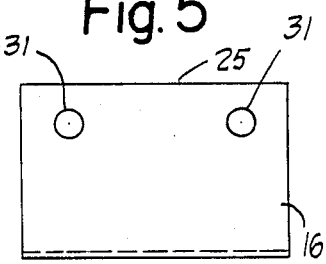
FIG. 6 is a front elevational view of the second piece.

FIG. 1 shows an electric motor mount 11 for an electric motor 12 which has a plurality of mounting points 13. In this embodiment, these plural mounting points are threaded apertures adapted to receive mounting screws 14 so that first and second sheet metal pieces 15 and 16 may be secured to the motor 12. These first and second pieces 15 and 16 are adapted to be secured to a support 17 and, as one example this may be a refrigeration cabinet, with the first piece being secured to this support by being inserted underneath a shoe or slot 18 and the second piece being secured to the support 17 by a screw 19. The motor 12 may drive a fan blade 20 for air circulation within the refrigeration cabinet.

The first piece 15 has first and second ends 23 and 24, respectively, and the second piece 16 has first and second ends 25 and 26, respectively. When initially constructed, the first and second pieces are flat, as shown in FIG. 8, and the first piece has a length longer than that of the second piece 16. In the preferred embodiment, the second piece has a length approximately two-thirds the length of the first piece 15. The second end 24 of the first piece 15 has a width larger than that of the first end 23, and in the preferred embodiment is about twice as wide. The first piece 15 has a median transition portion 28 which forms a transition in width between the wider second end 24 and the narrower first end 23. This median transition portion 28 is substantially complementary to a portion 29 of the second piece 16. In the preferred embodiment, the median transition portion 28 tapers from the width of the wide second end 24 to the width of the narrower first end 23. As best shown in FIG. 8, this median transition portion is generally trapezoidal in shape, and is complementary to a tapering or generally triangular portion 29 of the second piece 16.

At least one motor mounting aperture is provided in the first end of each of the first and second pieces, and in the preferred embodiment there are two such motor mounting apertures 31 in each first end. The first ends 23 and 25 have a combined width which is approximately equal to the width of the wider second end 24 of the first piece 15. Each of the first and second pieces 15 and 16 is folded on a fold line 33 and 34, respectively, and as better shown in FIGS. 3 through 7. These pieces are folded at about a 90-degree angle, so that the first ends 23 and 25 cooperate with the motor at the mounting screws 14, and the second ends 24 and 26 cooperate with the support 17 to which the motor 12 is adapted to be secured. Means is provided near the second end of each of the first and second pieces 15 and 16, respectively, to coact with the support 17 when these pieces 15 and 16 are attached to the motor 12. This support means, in the preferred embodiment, includes an elongated aperture 36 near the second end 26 of the second piece 16 and in the first piece 15, the support means includes support apertures 37 and also a fold line 38. This fold line folds the metal at about a 5-degree angle relative to the plane of the metal, and this effectively makes the metal stock thicker so that it will be wedgingly received under the shoe or slot 18 in the support 17, in case the support 17 has such a shoe. Other refrigeration cabinets do not have this shoe but, instead, have apertures to receive support screws 19 through the support apertures 37 into the support 17. The motor mount 11 of the present invention is adapted to be used with either of these two types of support currently used in the industry.

The electric motor mount 11 may be manufactured in an economical manner which conserves sheet metal and conserves labor time, both in the manufacture and in assembly to the motor 12. FIG. 8 illustrates this motor mount making method wherein a strip 42 of sheet metal is selected with a selected width and a long length. The positions of the first and second pieces 15 and 16 are determined on this sheet metal strip 42, so that these pieces are complementary nested pieces. In this preferred embodiment, an edge 43 of the median transition portion 28 of the first piece 15 is complementary to an edge 44 of the portion 29 of the second piece 16. Also, the opposite edge 45 of the median transition portion 28 is complementary to the opposite edge 46 of the next portion 29 in succession along the strip 42. The strip 42 has first and second edges 47 and 48, respectively, and the first ends of the first and second pieces alternate along this first edge 47. The wider second ends 24 of the first piece 15, being about twice as wide as the first end 23, lie in succession along the second edge 48. These first and second pieces completely fill the strip 42, with no waste except for the material punched to form the apertures.

The strip 42 may move in either direction, either right-to-left or left-to-right, during manfuacture. The pieces 15 and 16 may efficiently be mass-produced in a compound die in a sheet metal press or punching machine. There may be three stations, and in the first station all of the apertures preferably would be punched. The strip would then be indexed and, in this second station, the first and second pieces 15 and 16 would be blanked from the strip. The punching machine may be one wherein the punch rises up after punching after sufficiently to clear the strip. This allows no place for the pieces to go, however, so on the next indexing movement they are pushed forward to the third station, whereat a bending brake bends the pieces along the fold lines 33, 34, and 38, and then the pieces are pushed out of the press upon the next indexing movement. With automatic feed of screws and power screwdrivers, the assembly of the first and second pieces to the motor 12 is quickly accomplished, so that the assembled motor and mount is ready for shipping.

The spacing of the two mounting apertures 31 in the first ends of the pieces 15 and 16 corresponds to the spacing of the apertures in the motor 12 which is to be mounted. The length dimension of the first and second pieces 15 and 16 is, in this preferred embodiment, perpendicular to the length of the strip 42. This has the advantage that even though the width dimension of the strip may vary slightly as it comes from the slitter, this is a non-critical dimension and any variations are easily absorbed by the elongated aperture 36.

The motor mount of the present invention achieves two different pieces from one strip of stock, with virtually no waste. The nested complementary parts achieve a material utilization of high efficiency, that is, two pieces are obtained from less than twice the stock width. The present invention replaces an existing generally rectangular motor mount which is material-intensive. As compared with the prior art generally rectangular bracket, the amount of material is reduced by 49%. By utilizing the slight bend at the fold line 38 in the larger first piece 15, the same effective thickness of the prior art motor mount is achieved with thinner material, for an additional saving of 24% of material. By this means, the second end 24 of the first piece 15 fits in the shoe 18 snugly and with spring retention for a rattle-free mounting of the motor 12. By nesting the two pieces 15 and 16 in succession along the strip 42, both pieces 15 and 16 are obtained upon each stroke of the press automatically. This is contrasted with the prior art forming method of blanking a rectangular piece from strip stock and then multiple-forming in a separate operation. This virtually eliminates labor content in the motor mount.

The present disclosure includes that contained in the appended claims, as well as that of the foregoing description. Although this invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed.

What is claimed is:

1. An electric motor mount for a motor having a plurality of mounting points, said electric motor mount comprising, in combination:

first and second sheet metal pieces; said first piece having a length between first and second ends and said second piece having a length between first and second ends;

said second end of said first piece being wider than said first end;

the combined width of said first ends of said first and second pieces approximately the width of the second end of said first piece;

said first piece having a median transition portion forming a transition in width between said wider second end and said narrower first end;

said median transition portion being substantially complementary to a portion of said second piece;

at least one motor mounting aperture near said first end of each of said first and second pieces corresponding to at least one of said plurality of mounting points on the motor; and means near said second end of each of said first and second pieces to coact with a support for the motor with attached first and second pieces.

2. An electric motor mount as set forth in claim 1, wherein said second piece has a length approximately two-thirds the length of said first piece.

3. An electric motor mount as set forth in claim 1, wherein said median transition portion of said first piece is substantially trapezoidal.

4. An electric motor mount as set forth in claim 1, including two motor mounting apertures in said first end of each of said pieces.

5. An electric motor mount as set forth in claim 4, wherein the spacing of said two apertures corresponds to the apertures in the motor being mounted.

6. An electric motor mount as set forth in claim 1, wherein said portion of said second piece tapers toward a narrower second end than said first end thereof.

7. An electric motor mount as set forth in claim 6, wherein an edge of said tapered portion of said second piece is complementary to a part of said transition portion of said first piece.

8. An combined electric motor and mount for a motor having a plurality of mounting points, said electric motor mount comprising, in combination:

first and second sheet metal pieces;

said first piece having a length between first and second ends and said second piece having a length between first and second ends;

said second end of said first piece being wider than said first end thereof;

the combined width of said first ends of said first and second pieces approximating the width of the second end of said first piece;

said first piece having a median transition portion forming a transition in width between said wider second end and said narrower first end;

said median transition portion being substantially complementary to a portion of said second piece;

at least one motor mounting aperture near said first end of each of said first and second pieces corresponding to at least one of said plurality of mounting points on said motor; and means attaching said first end of each piece at said at least one motor mounting aperture thereof to said motor at said mounting points thereof.

9. The combined electric motor and mount as set forth in claim 8, wherein said second piece has a length approximately two-thirds the length of said first piece.

10. The combined electric motor and mount as set forth in claim 8, wherein said median transition portion of said first piece is substantially trapezoidal.

11. The combined electric motor and mount as set forth in claim 8, including two motor mounting apertures in said first end of each of said pieces.

12. The combined electric motor and mount as set forth in claim 11, wherein the spacing of said two apertures corresponds to the apertures in the motor being mounted.

13. The combined electric motor and mount as set forth in claim 8, wherein said portion of said second piece tapers toward a narrower second end than said first end thereof.

14. The combined electric motor and mount as set forth in claim 13, wherein an edge of said tapered portion of said second piece is complementary to a part of said transition portion of said first piece.

15. The combined electric motor and mount as set forth in claim 8, including means near said second end of each of said first and second pieces to coact with a support for said motor with attached first and second pieces.

* * * * *

UNITED STATES PATENT AND TRADEMARK OFFICE
CERTIFICATE OF CORRECTION

PATENT NO. : 4,849,667

DATED : July 18, 1989

INVENTOR(S) : Giles W. Morrill

It is certified that error appears in the above-identified patent and that said Letters Patent is hereby corrected as shown below:

Column 1, line 55, "approximately" should be --approximating--.

Column 4, line 14, "after" (second occurrence) should be --just--.

Column 5, line 11, "approximately" should be --approximating--.

Signed and Sealed this

Fifteenth Day of May, 1990

Attest:

HARRY F. MANBECK, JR.

*Attesting Officer*      *Commissioner of Patents and Trademarks*